United States Patent
Takaichi et al.

(10) Patent No.: US 11,591,721 B2
(45) Date of Patent: Feb. 28, 2023

(54) ACID-TYPE CARBOXYMETHYLATED CELLULOSE NANOFIBER AND PRODUCTION METHOD THEREOF

(71) Applicant: NIPPON PAPER INDUSTRIES CO., LTD., Kita-ku (JP)

(72) Inventors: Satoshi Takaichi, Tokyo (JP); Takeshi Fujii, Tokyo (JP); Kenichiro Sasaki, Tokyo (JP); Makoto Matsumoto, Tokyo (JP); Shinichi Onogi, Tokyo (JP)

(73) Assignee: NIPPON PAPER INDUSTRIES CO., LTD., Kita-ku (JP)

(*) Notice: Subject to any disclaimer, the term of this patent is extended or adjusted under 35 U.S.C. 154(b) by 305 days.

(21) Appl. No.: 16/471,375

(22) PCT Filed: Nov. 2, 2017

(86) PCT No.: PCT/JP2017/039808
§ 371 (c)(1),
(2) Date: Jun. 19, 2019

(87) PCT Pub. No.: WO2018/116660
PCT Pub. Date: Jun. 26, 2018

(65) Prior Publication Data
US 2019/0330767 A1   Oct. 31, 2019

(30) Foreign Application Priority Data

Dec. 21, 2016  (JP) .............................. JP2016-248484
Mar. 17, 2017  (JP) .............................. JP2017-052281
May 15, 2017  (JP) .............................. JP2017-096155

(51) Int. Cl.
*D01F 2/24* (2006.01)
*C08B 11/12* (2006.01)
*D01C 1/00* (2006.01)

(52) U.S. Cl.
CPC ............... *D01F 2/24* (2013.01); *C08B 11/12* (2013.01); *D01C 1/00* (2013.01)

(58) Field of Classification Search
CPC .................................. C08B 11/12; D01C 1/00
See application file for complete search history.

(56) References Cited

U.S. PATENT DOCUMENTS

| | | |
|---|---|---|
| 2,617,800 A | 11/1952 | Bergman |
| 4,574,151 A | 3/1986 | Adams |
| 4,579,943 A | 4/1986 | Kamide et al. |
| 9,005,841 B2 * | 4/2015 | Kim .................... H01M 8/1053 429/482 |
| 9,327,426 B2 | 5/2016 | Yano et al. |
| 2012/0065389 A1 | 3/2012 | Miyawaki et al. |
| 2013/0289170 A1 * | 10/2013 | Takizawa ................ C08L 67/00 524/35 |
| 2015/0027648 A1 | 1/2015 | Tsuji et al. |
| 2016/0333116 A1 | 11/2016 | Nakatani et al. |

FOREIGN PATENT DOCUMENTS

| | | |
|---|---|---|
| GB | 1006515 A | 10/1965 |
| JP | 44-560 B1 | 1/1969 |
| JP | 56-143201 A | 11/1981 |
| JP | 59-56402 A | 3/1984 |
| JP | 60-94401 A | 5/1985 |
| JP | 61-157503 A | 7/1986 |
| JP | 2-241534 A | 9/1990 |
| JP | 3-279471 A | 12/1991 |
| JP | 4-314701 A | 11/1992 |
| JP | 5-39301 A | 2/1993 |
| JP | 10-251301 A | 9/1998 |
| JP | 11-246601 A | 9/1999 |
| JP | 2000-281702 A | 10/2000 |
| JP | 2007-254588 A | 10/2007 |
| JP | 2008-19344 A | 1/2008 |
| JP | 2008-56889 A | 3/2008 |
| JP | 2008-247975 A | 10/2008 |
| JP | 2010-254928 A | 11/2010 |
| JP | 2011-195738 A | 10/2011 |
| JP | 2012-36375 A | 2/2012 |
| JP | 5727660 B1 | 6/2015 |
| JP | 2015-160812 A | 9/2015 |
| JP | 2016-69589 A | 5/2016 |

(Continued)

OTHER PUBLICATIONS

International Search Report dated Dec. 5, 2017, in PCT/JP2017/039808 filed on Nov. 2, 2017.

(Continued)

*Primary Examiner* — Leigh C Maier
*Assistant Examiner* — Everett White
(74) *Attorney, Agent, or Firm* — Oblon, McClelland, Maier & Neustadt, L.L.P.

(57) ABSTRACT

An object is to provide an acid-type carboxymethylated cellulose nanofiber in which the viscosity is not excessively high at the time of preparing a dispersion liquid and the introduced carboxymethyl group is desalted to convert the acid type, and the acid-type carboxymethylated cellulose nanofiber has 0.01 to 0.50 of the degree of substitution with carboxymethyl group per glucose unit, wherein the B-type viscosity in an aqueous dispersion with a concentration of 0.95 to 1.05% by mass is 1000 mPa·s or more under the condition of 60 rpm and 20° C., and 7000 mPa·s or more under the condition of 6 rpm and 20° C.

20 Claims, No Drawings

(56) References Cited

FOREIGN PATENT DOCUMENTS

| JP | 2016-69623 A | 5/2016 |
|---|---|---|
| JP | 2016-166258 A | 9/2016 |
| JP | 2016-186018 A | 10/2016 |
| JP | 6228707 B1 | 11/2017 |
| WO | WO 2010/116794 A1 | 10/2010 |
| WO | WO 2013/137140 A1 | 9/2013 |
| WO | WO 2014/088072 A1 | 6/2014 |
| WO | WO 2015/107995 A1 | 7/2015 |

OTHER PUBLICATIONS

Cellulose Encyclopedia, Nov. 10, 2000, Asakura Publishing Co., Ltd., 9 pages (with partial English translation).
Perrier, D. M. et al., "Properties of Carboxymethylated Cotton Prepared in Nonaqueous Media", Journal of Applied Polymer Science, vol. 17, 1973, pp. 3375-3389.
Swintosky J. V. et al., "A Note on the preparation of Powdered Carboxymethylcellulose and Linseed Acids", Journal of the American Pharmaceutical Association, vol. 42, 1953, p. 505.

\* cited by examiner

ACID-TYPE CARBOXYMETHYLATED CELLULOSE NANOFIBER AND PRODUCTION METHOD THEREOF

TECHNICAL FIELD

The present invention relates to an acid-type carboxymethylated cellulose nanofiber and a production method thereof.

BACKGROUND ART

There is known a technique of mercerizing a cellulose-based raw material and thereafter reacting the resultant with monochloroacetic acid or sodium monochloroacetate thereby to introduce a carboxymethyl group into cellulose (for example, see Patent Document 1). In the cellulose to which the carboxymethyl group is introduced, the carboxymethyl group is negatively charged in the solution. Therefore, when the cellulose to which the carboxymethyl group is introduced is fibrillated in the solvent, the dispersion liquid of a cellulose nanofiber is obtained (for example, see Patent Document 2).

The cellulose nanofiber is a biodegradable water-dispersible material. Since the cellulose nanofiber obtained by the aforementioned method is in the form of dispersion liquid, it can also be modified by blending with various water-soluble polymers or complexing with an organic or inorganic pigment. Also, the cellulose nanofiber can be transformed into a sheet or a fiber. Taking advantage of such properties, developing novel highly functional commercial products by applying the cellulose nanofiber to highly functional packaging materials, transparent organic substrate members, highly functional fibers, separation membranes, regenerative medical materials, and the like are studied.

For using the cellulose nanofiber as a thickener, a gelling agent, a shape retention agent, an emulsification stabilizer, a dispersion stabilizer, and the like, a method for producing aqueous dispersion of a partial acid-type CMC salt nanofiber has been proposed (for example, see Patent Document 3).

Also, in consideration of the application to the aforementioned uses, it is preferable to produce high concentration dispersion liquid of the cellulose nanofiber. However, when the concentration of the dispersion liquid of the cellulose nanofiber is high, the viscosity thereof becomes excessively high. Thus, a problem in terms of handling properties may arise.

In view of such a problem, a technique for improving the fluidity of the cellulose nanofiber to which the carboxymethyl group is introduced has been proposed (for example, see Patent Document 4).

Patent Document 4 discloses a method for producing cellulose nanofiber dispersion liquid having excellent fluidity by containing a certain amount of monovalent or divalent metal ions in anion modified cellulose nanofiber dispersion liquid. In the Document, a carboxy group and a carboxymethyl group are exemplified as anionic modifications.

PRIOR ART DOCUMENTS

Patent Documents

Patent Document 1: JP-A-H10-251301
Patent Document 2: JP-A-2011-195738
Patent Document 3: JP-B-5727660
Patent Document 4: WO-A1-2013-137140

SUMMARY OF INVENTION

Problem to be Solved by the Invention

In the cellulose nanofiber produced by the production method disclosed in the Patent Document 3, a part of the introduced carboxymethyl group is the alkali salt type, and the residue is the acid type. In some use applications of the cellulose nanofiber, it may be preferable that the ratio of the introduced salt-type carboxymethyl group may be preferably as small as possible.

However, as understood from the result of Comparative Example (Y) of the Patent Document 3, when minimizing the ratio of the salt-type carboxymethyl group introduced thereto as small as possible, there is a problem that an intended acid-type cellulose nanofiber cannot be produced by a known production method.

Also, in the cellulose nanofiber dispersion liquid obtained in the method described in the Patent Document 4, it is inferred that the effect of excellent fluidity is due to the reason that the cellulose nanofibers are partially bonded with each other by containing monovalent or divalent metal ions in the anion modified cellulose nanofiber dispersion liquid to decrease the number of fibers in the dispersion liquid. Therefore, it is inferred that the intended effect of excellent fluidity may not be achieved because the monovalent or divalent metal ions are deposited as a metal chloride by subjecting to the acid treatment with hydrochloric acid or the like. Also, since the cellulose nanofibers are partially bound with each other by including the metal ions, there is a concern that the fiber length or the fiber diameter may increase.

Therefore, there is room for improvement in applying, to a novel highly functional commercial product, the cellulose nanofiber dispersion liquid where the carboxymethyl group is introduced and the metal salt is substituted with the proton.

An object of the present invention is to provide an acid-type carboxymethylated cellulose nanofiber in which the viscosity is not excessively high in dispersion liquid and the introduced carboxymethyl group is desalted to convert the acid type, and a production method thereof.

Means for Solving Problem

The present inventors have intensively conducted research on the aforementioned problem, and found that the problem can be solved by introducing the carboxymethyl group and thereafter performing the desalting treatment with a cation exchange resin to convert the acid type. Thus, the present invention has been accomplished.

That is, the present inventors provide the following [1] to [9]:

[1] An acid-type carboxymethylated cellulose nanofiber, wherein a degree of substitution with carboxymethyl group per glucose unit is 0.01 to 0.50, and a B-type viscosity in aqueous dispersion with a concentration of 0.95 to 1.05% by mass is 1000 mPa·s or more under a condition of 60 rpm and 20° C., and 7000 mPa·s or more under a condition of 6 rpm and 20° C.

[2] The acid-type carboxymethylated cellulose nanofiber according to [1], wherein a ratio of a carboxy group determined by the following formula (1) is 40% or more:

a ratio (%) of carboxy group=(an amount of the carboxy group/an amount of the carboxy group and an amount of a carboxylate group)×100.   (1):

[3] The acid-type carboxymethylated cellulose nanofiber according to [1] or [2], wherein a light transmittance thereof at a wavelength of 660 nm in the aqueous dispersion with a concentration of from 0.95 to 1.05% by mass is 65% or more.

[4] A method for producing an acid-type carboxymethylated cellulose nanofiber comprising: a fibrillation process of fibrillating carboxymethylated cellulose; and a desalting process of performing a desalting treatment through a cation exchange reaction, wherein the desalting process is a process of performing the desalting treatment with a cation exchange resin.

[5] The method for producing an acid-type carboxymethylated cellulose nanofiber according to [4], wherein the carboxymethylated cellulose is obtained by subjecting a cellulose-based raw material to a mercerization treatment with a mercerizing agent and then reacting the resultant with a carboxymethylating agent.

[6] The method for producing an acid-type carboxymethylated cellulose nanofiber according to [5], wherein the mercerizing agent is an alkali metal hydroxide.

[7] The method for producing an acid-type carboxymethylated cellulose nanofiber according to [5] or [6], wherein the carboxymethylating agent is a compound represented by the following general formula (1):

[Chemical formula 1]

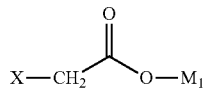

(1)

(in the general formula (1), X represents a halogen atom, and $M_1$ represents a hydrogen atom or an alkali metal).

[8] The method for producing an acid-type carboxymethylated cellulose nanofiber according to any one of [4] to [7], wherein the fibrillation process is a process of fibrillating the carboxymethylated cellulose to obtain a carboxymethylated cellulose nanofiber salt, and the desalting process is a process of desalting the carboxymethylated cellulose nanofiber salt with the cation exchange resin.

[9] The method for producing an acid-type carboxymethylated cellulose nanofiber according to any one of [4] to [8], further comprising: a viscosity lowering process of subjecting the carboxymethylated cellulose to a viscosity lowering treatment.

Effect of the Invention

According to the present invention, there can be provided an acid-type carboxymethylated cellulose nanofiber in which the viscosity is not excessively high in dispersion liquid and the introduced carboxymethyl group is desalted to convert the acid type, and a production method thereof.

EMBODIMENTS FOR CARRYING OUT THE INVENTION

Hereinafter, the present invention will be described in detail in conformity with suitable embodiments.

Incidentally, in this specification, a carboxy group indicates a group represented by —COOH, and a carboxylate group indicates a group represented by —COO$^-$. The counter cation of the carboxylate group is not particularly limited. Examples thereof may include alkali metal ions such as a sodium ion and a potassium ion.

[1. Acid-Type Carboxymethylated Cellulose Nano Fiber]

The acid-type carboxymethylated cellulose nanofiber of the present invention is obtained by desalting the carboxymethyl group to convert the acid type. In addition, in the acid-type carboxymethylated cellulose nanofiber of the present invention, the degree of substitution with carboxymethyl group per glucose unit is from 0.01 to 0.50, and the B-type viscosity in aqueous dispersion with a concentration of from 0.95 to 1.05% by mass is 1000 mPa·s or more under the condition of 60 rpm and 20° C., and 7000 mPa·s or more under the condition of 6 rpm and 20° C.

When the carboxymethyl group is desalted with the cation exchange resins to convert the acid type, the acid-type carboxymethylated cellulose nanofiber satisfies the aforementioned two requirements of the B-type viscosity in aqueous dispersion with a concentration of from 0.95 to 1.05% by mass.

The degree of substitution with carboxymethyl in the acid-type carboxymethylated cellulose nanofiber of the present invention is from 0.01 to 0.50, preferably from 0.01 to 0.40, and more preferably from 0.05 to 0.35. Since the celluloses to which the carboxymethyl group is introduced electrically repel each other, such cellulose can be easily fibrillated to a nano-order fiber diameter. When the degree of substitution with carboxymethyl group per glucose unit is less than 0.01, the electrical repelling force is so small that the cellulose cannot be sufficiently fibrillated in some cases. On the other hand, when the degree of substitution with carboxymethyl group per glucose unit exceeds 0.50, the acid-type carboxymethylated cellulose nanofiber is swollen or dissolved, and cannot retain the fiber form. Accordingly, the cellulose cannot be obtained as fibers in some cases.

The degree of substitution with carboxymethyl group per glucose unit can be calculated by the following method. About 2.0 g (bone dry) of carboxymethylated cellulose is precisely weighed, and placed in a 300-mL stoppered Erlenmeyer flask. Into the flask, 100 mL of liquid obtained by adding 100 mL of special grade concentrated nitric acid to 1000 mL of methanol is added. The mixture is shaken for 3 hours to convert salt-type carboxymethylated cellulose (hereinafter, also referred to as "salt-type CM cellulose") into acid-type carboxymethylated cellulose (hereinafter, also referred to as "H-type CM cellulose"). The H-type CM cellulose (bone dry) is precisely weighed in an amount of 1.5 to 2.0 g, and placed in a 300-mL stoppered Erlenmeyer flask. The H-type CM cellulose is wetted with 15 mL of 80% methanol, and added with 100 mL of 0.1 N NaOH. The mixture is shaken at room temperature for 3 hours. Using phenolphthalein as an indicator, excess NaOH is back titrated with 0.1N $H_2SO_4$. The degree of substitution (DS) with carboxymethyl group can be calculated according to the following formula:

$A=[(100×F'-(0.1 NH_2SO_4 \text{ (mL)})×F)×0.1]/(\text{bone dry mass (g) of H-type CM cellulose})$ $DS=0.162×A/(1-0.058×A)$ A: amount (mL) of 1N NaOH necessary to neutralize 1 g of H-type CM cellulose
F': factor of 0.1N $H_2SO_4$
F: factor of 0.1N NaOH The degree of substitution with carboxymethyl group of the acid-type carboxymethylated cellulose nanofiber and the degree of substitution with carboxymethyl group of the carboxymethylated cellulose usually have an identical value.

In the acid-type carboxymethylated cellulose nanofiber of the present invention, the lower limit value of the B-type viscosity in the aqueous dispersion with the concentration of 0.95 to 1.05% by mass is 1000 mPa·s or more under the condition of 60 rpm and 20° C., preferably 1300 mPa·s or more, more preferably 1800 mPa·s or more, further preferably 3000 mPa·s or more, and still more preferably 4000 mPa·s or more. The upper limit value thereof is preferably 25000 mPa·s or less, more preferably 23000 mPa·s or less, more preferably 22500 mPa·s or less, further preferably 20000 mPa·s or less, and still more preferably 15000 mPa·s or less.

In addition, the lower limit value of the B-type viscosity under the condition of 6 rpm and 20° C. is 7000 mPa·s or more, preferably 9000 mPa·s or more, more preferably 15000 mPa·s or more, and further preferably 22500 mPa·s or more. The upper limit value thereof is preferably 150000 mPa·s or less, more preferably 130000 mPa·s or less, further preferably 100000 mPa·s or less, and still more preferably 60000 mPa·s or less. The acid-type carboxymethylated cellulose nanofiber of the present invention having such a viscosity can be expected to be used as a viscosity modifier to be added to, for example, foods and cosmetics.

Incidentally, the B type viscosity can be measured by a known method. For example, it can be measured by using a viscometer VISCOMETER TV-10 available from Toki Sangyo Co., Ltd.

International Publication No. 2014/088072 is a document published before the priority date of this application, and is an application by the present applicant for a carboxymethylated cellulose nanofiber which is not converted into the acid-type (hereinafter, also referred to as a "salt-type carboxymethylated cellulose nanofiber"). As understood from Table 1 of Paragraph 0056 in the International Publication No. 2014/088072, the value of the B-type viscosity of the carboxymethylated cellulose nanofiber varies depending on the degree of substitution with carboxymethyl group and the average fiber diameter. The degree of substitution with carboxymethyl group and the average fiber diameter may vary depending on the pressure of machine processing and the number of processing operations, and the type and amount of a raw material such as sodium hydroxide at the time of introducing a carboxymethyl group. Therefore, the value of the B-type viscosity can be changed by changing production conditions such as the pressure of machine processing and the number of processing operations, the type and amount of a raw material such as sodium hydroxide at the time of introducing a carboxymethyl group, and the like.

In the acid-type carboxymethylated cellulose nanofiber of the present invention, the ratio of the carboxy group is preferably 40% or more, more preferably 60% or more, and further preferably 85% or more.

When the introduced carboxymethyl group is desalted with the cation exchange resins to convert the acid type, the ratio of the carboxy group in the acid-type carboxymethylated cellulose nanofiber of the present invention satisfies the above-described requirement.

The ratio of the carboxy group can be calculated by the following method.

First, 250 mL of 0.1% by mass slurry of a carboxymethylated cellulose nanofiber salt is prepared. To the prepared slurry, 0.1M hydrochloric acid aqueous solution is added so that the pH is adjusted to 2.5. After that, while 0.1N sodium hydroxide aqueous solution is added, the degree of electrical conductivity is measured until the pH reaches 11. From the amount of sodium hydroxide (a) consumed in the neutralization stage of weak acid in which the change in electrical conductivity is moderate, the amount of the carboxy group and the amount of the carboxylate group are calculated according to the following formula (2):

$$\text{amount of carboxy group and amount of carboxylate group (mmol/g carboxymethylated cellulose nanofiber salt)} = a \text{ (ml)} \times 0.1/\text{mass (g) of carboxymethylated cellulose nanofiber salt.} \quad (2)$$

Next, 250 mL of 0.1% by mass slurry of a desalted acid-type carboxymethylated cellulose nanofiber is prepared. While 0.1N sodium hydroxide aqueous solution is added to the prepared slurry, the degree of electrical conductivity is measured until the pH reaches 11. From the amount of sodium hydroxide (b) consumed in the neutralization stage of weak acid in which the change in electrical conductivity is moderate, the amount of the carboxy group is calculated according to the following formula (3):

$$\text{amount of carboxy group (mmol/g carboxymethylated cellulose nanofiber)} = b \text{ (ml)} \times 0.1/\text{mass (g) of carboxymethylated cellulose nanofiber.} \quad (3)$$

From the calculated amount of the carboxy group and the calculated amount of the carboxylate group, and the calculated amount of the carboxy group, the ratio of the carboxy group can be calculated according to the following formula (1):

$$\text{ratio (\%) of carboxy group} = (\text{amount of carboxy group}/\text{amount of carboxy group and amount of carboxylate group}) \times 100. \quad (1)$$

In the acid-type carboxymethylated cellulose nanofiber of the present invention, the light transmittance at a wavelength of 660 nm in the aqueous dispersion with the concentration of 0.95 to 1.05% by mass is preferably 65% or more, and more preferably 70% or more.

Incidentally, the light transmittance can be measured by using a UV-VIS spectrophotometer UV-265FS (manufactured by Shimadzu Corporation).

In the acid-type carboxymethylated cellulose nanofiber of the present invention, an average fiber diameter is preferably from 2 to 500 nm, and more preferably from 3 to 150 nm.

The average fiber length and the average fiber diameter of the acid-type carboxymethylated cellulose nanofiber can be calculated by analyzing 200 fibers, which are randomly selected, using a field emission scanning electron microscope (FE-SEM).

[2. Production Method]

The method for producing the acid-type carboxymethylated cellulose nanofiber of the present invention includes a fibrillation process of fibrillating carboxymethylated cellulose, and a desalting process of performing a desalting treatment through a cation exchange reaction. The desalting process is a process of performing the desalting treatment with cation exchange resins.

Hereinafter, a mode of performing the fibrillation process of fibrillating carboxymethylated cellulose to obtain a carboxymethylated cellulose nanofiber salt and thereafter performing the desalting process by bringing the carboxymethylated cellulose nanofiber salt into contact with the cation exchange resins to obtain an acid-type carboxymethylated cellulose nanofiber is called "one embodiment". Another mode of performing the desalting process by bringing carboxymethylated cellulose into contact with the cation exchange resins and thereafter performing the fibrillation process of fibrillating the desalted carboxymethylated cellulose to obtain an acid-type carboxymethylated cellulose nanofiber is called "another embodiment".

In dispersion liquid of the carboxymethylated cellulose nanofiber salt, a metal salt of the cellulose nanofiber to which the carboxymethyl group was introduced was acid treated with hydrochloric acid to substitute the metal salt with the proton. As a result, a filtered material could not be obtained. It is inferred that this is because the proton exchange reaction between the carboxymethylated cellulose nanofiber salt and the hydrochloric acid did not efficiently proceed so that an acid-type carboxymethylated cellulose nanofiber substituted with the proton is hardly obtained. The reason why the proton exchange reaction does not efficiently proceed is not known. However, it is inferred that this is because the side reaction such that the added acid is consumed by the hydrolysis reaction of a β-1,4-glycoside bond of cellulose is proceeded.

Therefore, according to the method for producing the acid-type carboxymethylated cellulose nanofiber of the present invention, an acid-type carboxymethylated cellulose nanofiber, which could not be produced in the prior art, can be produced, and the ratio of the carboxy group can be increased.

On the other hand, in one embodiment of the method for producing the acid-type carboxymethylated cellulose nanofiber of the present invention, a cation salt of the cellulose nanofiber to which the carboxymethyl group is introduced is substituted with the proton by an acid treatment with the cation exchange resins. When the acid treatment is performed with the cation exchange resins, an unnecessary by-product such as sodium chloride is not generated. Therefore, after the acid treatment with the cation exchange resins, an acid-type carboxymethylated cellulose nanofiber can be obtained only by filtering out the cation exchange resins through a metal mesh or the like.

An object to be removed as a filtered material through a metal mesh or the like is the cation exchange resins, and the acid-type carboxymethylated cellulose nanofiber is hardly removed through the diameter of the metal mesh or the like. Therefore, it is inferred that even when cellulose nanofibers are separated from each other to increase the number of fibers in the dispersion liquid, a large amount of acid-type carboxymethylated cellulose nanofibers having an extremely short fiber length are contained so that the excessive increase of the viscosity in the dispersion liquid can be suppressed.

Furthermore, a large amount of acid-type carboxymethylated cellulose nanofibers having a short fiber length is contained in the filtrate, and the filtrate does not need to be washed or dehydrated. Therefore, the acid-type carboxymethylated cellulose nanofibers are hardly aggregate. It is inferred that this also accounts for suppressing the increase of the viscosity in the dispersion liquid.

2-1. One Embodiment

[2-1-1. Fibrillation Process]

In one embodiment, the fibrillation process is a process of fibrillating carboxymethylated cellulose to obtain a carboxymethylated cellulose nanofiber salt. The surface of the carboxymethylated cellulose to which the carboxymethyl group is introduced has the repelling action of the carboxymethyl group. Thus, the nanofibers can be more easily obtained by the fibrillation treatment. The fibrillation treatment usually means physical fibrillation treatment.

(Carboxymethylated Cellulose)

Carboxymethylated cellulose may be a synthetic product obtained by subjecting a cellulose-based raw material to a mercerization treatment with a mercerizing agent and then reacting the resultant with a carboxymethylating agent, a synthetic product obtained by introducing a carboxymethyl group into a cellulose-based raw material with a known method, or a commercially available product.

The partial structure of the carboxymethylated cellulose is shown in the following general formula (2).

[Chemical formula 2]

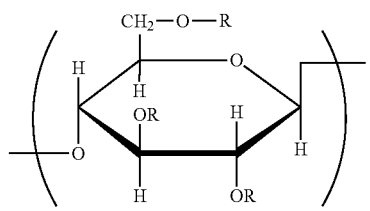

(2)

(In the general formula (2), each R independently represents a hydrogen atom, an alkali metal or a group represented by the general formula (3).)

[Chemical formula 3]

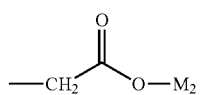

(3)

(In the general formula (3), $M_2$ represents a hydrogen atom or an alkali metal.)

Examples of the alkali metal represented by R in the general formula (2) and $M_2$ in the general formula (3) include sodium and potassium. Among these, sodium is preferable.

The mercerization treatment may be usually performed by mixing a cellulose-based raw material, a solvent, and a mercerizing agent.

The cellulose-based raw material include wood-derived kraft pulp and sulfite pulp, powdered cellulose obtained by pulverizing the pulp using a high-pressure homogenizer, a mill, and the like, or microcrystalline cellulose powder obtained by refining the powdered cellulose through a chemical treatment such as acid hydrolysis. In addition, the plant-derived cellulose-based raw materials such as kenaf, hemp, rice, bagasse, and bamboo may also be used. From the viewpoint of mass production and costs, it is preferable to use powdered cellulose, microcrystalline cellulose powder, or chemical pulp such as kraft pulp or sulfite pulp. Powdered cellulose or microcrystalline cellulose powder can provide a cellulose nanofiber supplying dispersion liquid having a low viscosity even at a high concentration. When chemical pulp is used, it is preferable to perform a known bleaching treatment to remove lignin. Examples of bleached pulp include bleached kraft pulp and bleached sulfite pulp having a brightness (ISO 2470) of 80% or more.

Powdered cellulose is a rod axis-like particle formed by microcrystalline or crystalline cellulose, which is obtained by removing the amorphous portion of wood pulp by acid hydrolysis and thereafter performing pulverization and sieving. In the powdered cellulose, the degree of polymerization of cellulose is from about 100 to about 500, the crystallization degree of powdered cellulose measured by X-ray diffraction is from 70 to 90%, and the volume average particle diameter measured by a laser diffraction particle size distribution apparatus is usually 100 µm or less, and preferably 50 µm or less. When the volume average particle diameter is 100 µm or less, a cellulose nanofiber supplying dispersion liquid having excellent fluidity can be provided. As such powdered cellulose, it may be prepared by refining and drying the undecomposed residue obtained after the acid hydrolysis of selected pulp and then performing pulverization and sieving, and a commercially available product such as KC Flock (registered trademark) (manufactured by Nippon Paper Industries Co., Ltd.), Ceolus (registered trademark) (manufactured by Asahi Kasei Chemicals Corporation), and Avicel (registered trademark) (manufactured by FMC Corporation) may be used.

The bleaching method may be performed by combinations of chlorine treatment (C), chlorine dioxide bleaching (D), alkali extraction (E), hypochlorite bleaching (H), hydrogen peroxide bleaching (P), alkaline hydrogen peroxide treatment stage (Ep), alkaline hydrogen peroxide.oxygen treatment stage (Eop), ozone treatment (Z), chelate treatment (Q), and the like. For example, the bleaching method may be performed at the sequence such as C/D-E-H-D, Z-E-D-P, Z/D-Ep-D, Z/D-Ep-D-P, D-Ep-D, D-Ep-D-P, D-Ep-P-D, Z-Eop-D-D, Z/D-Eop-D, and Z/D-Eop-D-E-D. The "/" in the sequence indicates that the treatments before and after "/" are consecutively performed without washing.

Furthermore, the micronized materials of the aforementioned cellulose-based raw materials by using a disperser such as a high-speed rotation disperser, a colloid mill disperser, a high pressure disperser, a roll mill disperser, or an ultrasonic disperser, or a wet-type high pressure or ultra high pressure homogenizer, or the like, may also be used as a cellulose-based raw material.

The solvent is preferably water and/or a lower alcohol, and more preferably water. The used amount of the solvent in terms of mass is preferably from 3 to 20 times with respect to that of the cellulose-based raw material.

Examples of the lower alcohol include alcohols such as methanol, ethanol, n-propyl alcohol, isopropyl alcohol, n-butyl alcohol, isobutyl alcohol, and tertiary butyl alcohol. The lower alcohols may be used alone, and two or more types thereof may be used in combination as a mixed medium.

When the solvent contains a lower alcohol, the mixing ratio thereof is preferably from 60 to 95% by mass.

As the mercerizing agent, an alkali metal hydroxide is preferable, and sodium hydroxide or potassium hydroxide is more preferable. The used amount of the mercerizing agent in terms of mole is preferably from 0.5 to 20 times per anhydroglucose residue of the cellulose-based raw material.

The reaction temperature of the mercerization treatment is usually from 0 to 70° C., and preferably from 10 to 60° C. The reaction time of the mercerization treatment is usually from 15 minutes to 8 hours, and preferably from 30 minutes to 7 hours. The mercerization treatment may be performed under stirring.

After the mercerization treatment, a carboxymethylating agent is added to the reaction system to introduce the carboxymethyl group into the cellulose. As the carboxymethylating agent, a compound represented by the following general formula (1) is preferable, and monochloroacetic acid and sodium monochloroacetate are more preferable. The addition amount of the carboxymethylating agent in terms of mole is preferably from 0.05 to 10.0 times per anhydroglucose residue of the cellulose-based raw material.

[Chemical formula 4]

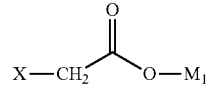

(1)

(In the general formula (1), X represents a halogen atom, and $M_1$ represents a hydrogen atom or an alkali metal.)

Examples of the halogen atom represented by X in the general formula (1) include a chlorine atom, a bromine atom, and an iodine atom. Among these, a chlorine atom is preferable.

Examples of the alkali metal represented by $M_1$ in the general formula (1) include sodium and potassium. Among them, sodium is preferable.

The reaction temperature of the carboxymethylation reaction is usually from 30 to 90° C., and preferably from 40 to 80° C. The reaction time is usually from 30 minutes to 10 hours, and preferably from 1 hour to 4 hours.

(Fibrillation)

The fibrillation treatment may be performed by, for example, using a known apparatus such as a high speed shear mixer and a high pressure homogenizer after sufficiently washing carboxymethylated cellulose with water. Examples of the type of a fibrillation apparatus include a high-speed rotation type, a colloid mill type, a high pressure type, a roll mill type, and an ultrasonic type. These apparatuses may be used alone, and two or more types thereof may also be used in combination.

When a high speed shear mixer is used, the shear speed is preferably 1000 $\text{sec}^{-1}$ or more. When the shear speed is 1000 $\text{sec}^{-1}$ or more, a uniform cellulose nanofiber salt having few aggregation structures can be obtained.

When the high pressure homogenizer is used, the applied pressure is preferably 50 MPa or more, more preferably 100 MPa or more, and further preferably 140 MPa or more. When the treatment is performed using a wet-type high pressure or ultra-high pressure homogenizer with the aforementioned pressure, the shortening fibrillation of the carboxymethylated cellulose efficiently proceeds. Thus, a carboxymethylated cellulose nanofiber salt having low viscosity in the aqueous dispersion liquid can be efficiently obtained.

The carboxymethylated cellulose is subjected to a fibrillation treatment in the form of the aqueous dispersion liquid such as water. When the concentration of the carboxymethylated cellulose in the aqueous dispersion liquid is high, the viscosity sometimes excessively increases during the fibrillation treatment. Thus, the carboxymethylated cellulose cannot fibrillate uniformly, or the apparatus sometimes stops in some cases. Therefore, the concentration of the carboxymethylated cellulose needs to be appropriately set depending on the treatment condition of the carboxymethylated cellulose. As an example, the concentration of the carboxymethylated cellulose is preferably from 0.3 to 50% (w/v), more preferably from 0.5 to 10% (w/v), and further preferably from 1.0 to 5% (w/v).

[2-1-2. Desalting Process]

In one embodiment, the desalting process is a process of bringing the carboxymethylated cellulose nanofiber salt into contact with the cation exchange resins to obtain an acid-type carboxymethylated cellulose nanofiber. The cation salt of the carboxymethylated cellulose nanofiber salt is substituted with the proton by bringing it into contact with the cation exchange resins. Since the cation exchange resins are used, an unnecessary by-product such as sodium chloride is not generated. Therefore, after the acid treatment with the cation exchange resins, aqueous dispersion liquid of an acid-type carboxymethylated cellulose nanofiber can be obtained as a filtrate only by filtering out the cation exchange resins through a metal mesh or the like.

An object to be removed as a filtered material through a metal mesh or the like is the cation exchange resins, and the acid-type carboxymethylated cellulose nanofiber is hardly removed through the diameter of the metal mesh or the like. Accordingly, substantially all of the acid-type carboxymethylated cellulose nanofiber is contained in the filtrate. The filtrate contains a large amount of the acid-type carboxymethylated cellulose nanofiber having an extremely short fiber length. Also, since the filtrate does not need to be washed or dehydrated, the acid-type carboxymethylated cellulose nanofiber is hardly aggregated. It is inferred that aqueous dispersion of an acid-type carboxymethylated cellulose nanofiber having a high light transmittance can be obtained, and that the increase in viscosity can be suppressed at the time of preparing the dispersion liquid of the acid-type carboxymethylated cellulose nanofiber.

The aqueous dispersion liquid of the carboxymethylated cellulose nanofiber salt obtained in the fibrillation process may be used as it is for the desalting process. Also, water may be added to decrease the concentration as necessary.

As the cation exchange resin, any one of a strong acid ion exchange resin and a weak acid ion exchange resin may be used as long as the counter ion is $H^+$. Among these, the strong acid ion exchange resin is preferably used. Examples of the strong acid ion exchange resin and the weak acid ion exchange resin include a styrene-based resin or an acryl-based resin, to which sulfonic acid group or carboxy group is introduced.

The shape of the cation exchange resin is not particularly limited, and may be various shapes such as granules (particulate), membranes, and fibers. Among these, particulate is preferable, from the viewpoint of efficiently treating the carboxymethylated cellulose nanofiber salt and facilitating the separation after the treatment. As such a cation exchange resin, a commercially available product may be used. Examples of the commercially available product include Amberjet 1020, 1024, 1060, 1220 (manufactured by Organo Corporation), Amberlite IR-200C, IR-120B (manufactured by Tokyo Organic Chemical Industries Co., Ltd.), Lewatit SP 112, S100 (manufactured by Bayer AG), GEL CKO8P (manufactured by Mitsubishi Chemical Corporation), and Dowex 50W-X8 (manufactured by The Dow Chemical Company).

Contact of the carboxymethylated cellulose nanofiber salt with the cation exchange resins may be performed, for example, as follows. While stirring and shaking as necessary, the granular cation exchange resins and aqueous dispersion liquid of a carboxymethylated cellulose nanofiber salt are mixed to bring the carboxymethylated cellulose nanofiber salt into contact with the cation exchange resins for a certain time, and then the cation exchange resins and the aqueous dispersion are separated.

The concentration of the aqueous dispersion liquid and the ratio with the cation exchange resins are not particularly limited, and the skilled person in the art may appropriately set from the viewpoint of efficient proton substitution. As an example, the concentration of the aqueous dispersion liquid is preferably from 0.05 to 10% by mass. When the concentration of the aqueous dispersion liquid is less than 0.05% by mass, the time required for proton substitution may be too long. When the concentration of the aqueous dispersion liquid exceeds 10% by mass, sufficient proton substitution effect may not be obtained in some cases.

Contact time is also not particularly limited, and the skilled person in the art may appropriately set from the viewpoint of efficient proton substitution. For example, the contact may be performed for 0.25 to 4 hours.

At this time, the carboxymethylated cellulose nanofiber salt is brought into contact with an appropriate amount of cation exchange resins for a sufficient time, and then the cation exchange resins is removed as a filtered material by a metal mesh or the like, whereby an acid-type carboxymethylated cellulose nanofiber may be produced.

2-2. Another Embodiment

[2-2-1. Desalting Process]

In another embodiment, the desalting process is a process of bringing carboxymethylated cellulose into contact with the cation exchange resins. The cation salt of the carboxymethylated cellulose is substituted with the proton by contacting the cation exchange resins. Since the cation exchange resins are used, an unnecessary by-product such as sodium chloride is not generated. Therefore, after the acid treatment with the cation exchange resins, aqueous dispersion liquid of the carboxymethylated cellulose substituted with the proton can be obtained as a filtrate only by filtering out the cation exchange resins through a metal mesh or the like.

An object to be removed as a filtered material through a metal mesh or the like is the cation exchange resins, and the proton-substituted carboxymethylated cellulose is hardly removed through the diameter of the metal mesh or the like. Accordingly, substantially all of the proton-substituted carboxymethylated cellulose is contained in the filtrate. Since the filtrate does not need to be washed or dehydrated, the proton-substituted carboxymethylated cellulose is hardly aggregated. It is inferred that the excessive increase in viscosity can be suppressed at the time of preparing the dispersion liquid of the acid-type carboxymethylated cellulose nanofiber.

The carboxymethylated cellulose can be used in the form of aqueous dispersion liquid for the desalting process.

It is noted that the carboxymethylated cellulose is the same as that described in the aforementioned "(Carboxymethylated cellulose)". Also, the condition of the desalting process is the same as that described in the aforementioned "[2-1-2. Desalting process]".

[2-2-2. Fibrillation Process]

In another embodiment, the fibrillation process is a process of fibrillating the proton-substituted carboxymethylated cellulose to obtain an acid-type carboxymethylated cellulose nanofiber. The surface of the proton-substituted carboxymethylated cellulose to which the carboxymethyl group is introduced has the repelling action of the carboxymethyl group. Therefore, nanofibers can be more easily obtained by the fibrillation treatment.

The fibrillation treatment is the same as that described in the aforementioned "(Fibrillation)".

2-3. Viscosity Lowering Process

Both of one embodiment and another embodiment of the method for producing the carboxymethylated cellulose nanofiber of the present invention preferably further include a viscosity lowering process of lowering the viscosity of the carboxymethylated cellulose. The viscosity lowering process means a process of appropriately cutting the cellulose chain of the carboxymethylated cellulose to lower the viscosity. This process can be any process as long as the viscosity of the carboxymethylated cellulose is lowered. Examples thereof include an ultraviolet irradiation treatment, an oxidative decomposition treatment, and a hydrolysis treatment. Among these, a hydrolysis treatment is preferable.

The aforementioned treatments may be performed alone, and two or more types thereof may also be performed in combination.

It is preferable to wash the carboxymethylated cellulose before used for the viscosity lowering process, from the viewpoint of avoiding a side reaction. The method for washing is not particularly limited, and can be any known method.

(Hydrolysis Treatment)

A hydrolysis treatment is a treatment of adding an acid or an alkali to the carboxymethylated cellulose to hydrolyze the cellulose chain.

The reaction medium of the hydrolysis treatment is preferably water from the viewpoint of suppressing a side reaction.

It is inferred that the reason why the viscosity of the carboxymethylated cellulose can be lowered by hydrolysis with an acid is as follows.

The hydrated layer is formed around the carboxymethylated cellulose because of localizing the carboxymethyl group on the surface of the carboxymethylated cellulose. Therefore, it is considered that the carboxymethylated celluloses exist in proximity with each other, and the network is formed. When the hydrolysis is performed by addition of acid, the balance among charges in the network may be lost so that the strong network among cellulose molecules is lost. As a result, it is inferred that the specific surface area of the carboxymethylated cellulose is increased and the shortening fibrillation is promoted to lower the viscosity of the dispersion liquid.

As acid, it is preferable to use mineral acids such as sulfuric acid, hydrochloric acid, nitric acid, or phosphoric acid. For efficiently performing the reaction, it is preferable to use the dispersion liquid in which the carboxymethylated cellulose is dispersed in dispersion medium such as water.

The concentration of the carboxymethylated cellulose in the dispersion medium is preferably from 0.1 to 20% by mass, more preferably from 0.5 to 10% by mass, and further preferably from 1 to 5% by mass.

The condition of the hydrolysis may be any condition under which an acid can act on the amorphous portion of cellulose. For example, the addition amount of the acid relative to the bone dry mass of the carboxymethylated cellulose is preferably from 0.01 to 0.5% by mass, and further preferably from 0.1 to 0.5% by mass. When the addition amount of the acid is 0.01% by mass or more, it is preferable because the hydrolysis of the carboxymethylated cellulose proceeds to improve the efficiency of nano-fibrillation. When the addition amount of acid is 0.5% by mass or less, the excessive hydrolysis of the carboxymethylated cellulose can be suppressed to prevent the decrease of the yield of the cellulose nanofiber.

The pH value of the dispersion medium during hydrolysis is preferably from 2.0 to 4.0, and more preferably from 2.0 or more and less than 3.0. However, when an alkali remains in the dispersion medium of the carboxymethylated cellulose, the addition amount of the acid is preferably appropriately increased for adjusting the pH value of the dispersion medium to the aforementioned range. From the viewpoint of reaction efficiency, the reaction is preferably performed at a temperature of from 70 to 120° C. for 1 to 10 hours.

For efficiently performing the nano-fibrillation, an alkali such as sodium hydroxide is preferably added for neutralization, after the acid hydrolysis treatment.

It is inferred that the reason why the viscosity of the carboxymethylated cellulose can be lowered by hydrolysis with an alkali is as follows.

A large number of β-1,4-glycoside bonds are existed in the cellulose. Therefore, when the hydrolysis is performed by addition of alkali, the β-1,4-glycoside bonds are cut, leading to the shortening fibrillation of the carboxymethylated cellulose. As a result, the ratio of the carboxymethylated cellulose nanofiber having a short fiber length increases to lower the viscosity of the dispersion liquid of the carboxymethylated cellulose nanofiber.

When the hydrolysis is performed with an alkali, the pH value of the reaction solution during the reaction is preferably from 8 to 14, more preferably from 9 to 13, and further preferably from 10 to 12. When the pH value is less than 8, sufficient hydrolysis may not proceed so that the shortening fibrillation of the carboxymethylated cellulose is sometimes insufficient. On the other hand, when the pH value exceeds 14, hydrolysis proceeds, but the carboxymethylated cellulose after hydrolysis is colored. Therefore, since the obtained cellulose nanofiber is also colored, the transparency decreases to cause a problem of limiting the applicable technologies in some cases. The alkali used to adjust the pH value is not particularly limited as long as it is water-soluble, and is preferably sodium hydroxide from the viewpoint of manufacturing costs.

When the carboxymethylated cellulose is hydrolyzed in the alkaline solution, the carboxymethylated cellulose may be colored at yellow due to the generation of a double bond during β-elimination, and the obtained cellulose nanofiber is also colored. Accordingly, the transparency decreases to limit the applicable technologies in some cases. Therefore, for suppressing the generation of the double bond, the hydrolysis process is preferably performed with an oxidizing agent or a reducing agent as an auxiliary. When an oxidizing agent or a reducing agent is used during the hydrolysis treatment in the alkaline solution with a pH value of 8 to 14, the shortening fibrillation of the carboxymethylated cellulose can be performed while oxidizing or reducing the double bond. As the oxidizing agent or reducing agent, the agents having activity in the alkaline region can be used.

From the viewpoint of reaction efficiency, the addition amount of the auxiliary relative to the bone dried carboxymethylated cellulose is preferably from 0.1 to 10% by mass, more preferably from 0.3 to 5% by mass, and further preferably from 0.5 to 2% by mass.

Examples of the oxidizing agent include oxygen, ozone, hydrogen peroxide, and hypochlorite. Among these, the oxidizing agent is preferably oxygen, hydrogen peroxide, or hypochlorite, which hardly generates radicals, and more preferably hydrogen peroxide.

The oxidizing agents may be used alone, and two or more types thereof may also be used in combination.

Examples of the reducing agent include sodium borohydride, hydrosulfite, and sulfite.

The reducing agents may be used alone, and two or more types thereof may also be used in combination.

From the viewpoint of reaction efficiency, the reaction temperature during hydrolysis is preferably from 40 to 120° C., more preferably from 50 to 100° C., and further preferably from 60 to 90° C. When the temperature is low, hydrolysis may not proceed sufficiently so that the decrease in viscosity of the dispersion liquid of the carboxymethylated cellulose or the acid-type carboxymethylated cellulose nanofiber is sometimes insufficient. On the other hand, when the temperature is high, hydrolysis proceeds, but the carboxymethylated cellulose after hydrolysis is sometimes colored.

The reaction time for the hydrolysis is preferably from 0.5 to 24 hours, more preferably from 1 to 10 hours, and further preferably from 2 to 6 hours.

From the viewpoint of reaction efficiency, the concentration of the carboxymethylated cellulose in the alkaline solution is preferably from 1 to 20% by mass, more preferably from 3 to 15% by mass, and further preferably from 5 to 10% by mass.

(Ultraviolet Irradiation Treatment)

The ultraviolet irradiation treatment is a treatment of irradiating the carboxymethylated cellulose with ultraviolet rays. By the irradiation with ultraviolet rays, the viscosity of the dispersion liquid of the acid-type carboxymethylated cellulose nanofiber can be decreased. It is inferred that the reason is as follows. The ultraviolet rays directly act on the cellulose or the hemicellulose to make it low molecules. Thus, the shortening fibrillation of the cellulose chain in the carboxymethylated cellulose can be performed. Therefore, the ratio of the acid-type carboxymethylated cellulose nanofiber having a short fiber length also increases to lower the viscosity of the dispersion liquid of the acid-type carboxymethylated cellulose nanofiber.

When the carboxymethylated cellulose is irradiated with ultraviolet rays in the viscosity lowering process, the wavelength of the ultraviolet rays to be used is preferably from 100 to 400 nm, and more preferably from 100 to 300 nm. Among these, the ultraviolet rays having a wavelength of from 135 to 260 nm is preferable, because such ultraviolet rays directly act on cellulose or hemicellulose to make it low molecules, and thus the shortening fibrillation of the cellulose chain in the carboxymethylated cellulose can be performed.

As the light source for the irradiation with ultraviolet rays, those having as a light source a light in the wavelength region of 100 to 400 nm may be used. Examples thereof include a xenon short arc lamp, an ultra high pressure mercury lamp, a high pressure mercury lamp, a low pressure mercury lamp, a deuterium lamp, and a metal halide lamp.

These light sources may be used alone, and two or more types thereof may also be used in combination. The use of multiple light sources having different wavelength properties in combination is preferable, because simultaneous irradiation with ultraviolet rays having different wavelengths increases the number of cut portions in the cellulose chain or the hemicellulose chain to prompt the shortening fibrillation.

As the container to place the carboxymethylated cellulose during ultraviolet irradiation, it may be a hard glass container, for example, when the ultraviolet rays having the wavelength of 300 to 400 nm is used. When the ultraviolet rays having a short wavelength of less than 300 nm is used, it is preferable to use a quartz glass container capable of further transmitting the ultraviolet rays. The material of the container portion not involved in the light transmission reaction may be adequately selected from the materials which are less likely to deteriorate due to the wavelength of the ultraviolet rays to be used.

The concentration of the carboxymethylated cellulose when irradiated with ultraviolet rays is preferably from 0.1 to 12% by mass, more preferably from 0.5 to 5% by mass, and further preferably from 1 to 3% by mass. When the concentration of carboxymethylated cellulose is 0.1% by mass or more, energy efficiency is increased, which is preferable. When the concentration of carboxymethylated cellulose is 12% by mass or less, the fluidity of the carboxymethyl cellulose in the ultraviolet irradiation apparatus is good and the reaction efficiency is enhanced, which are preferable.

The temperature at the time of irradiation with ultraviolet rays is preferably from 20 to 95° C., more preferably from 20 to 80° C., and further preferably from 20 to 50° C. When the temperature is 20° C. or higher, the efficiency of photooxidation reaction is increased, which is preferable. When the temperature is 95° C. or lower, there is no possibility of adverse influences such as deterioration of the quality of the carboxymethylated cellulose and there is no possibility that the pressure in the reaction apparatus will exceed the atmospheric pressure, and it is unnecessary to design an apparatus in consideration of pressure resistance, which are preferable.

The pH value at the time of irradiation with ultraviolet rays is not particularly limited, but from the viewpoint of simplifying the process, it is preferable that it is the neutral region, for example, the pH value is from about 6.0 to about 8.0.

The degree of irradiation applied to the carboxymethylated cellulose during ultraviolet irradiation may be optionally set by adjusting the retention time of the carboxymethylated cellulose in the irradiation reaction apparatus, by adjusting the energy amount of the irradiation light source, and the like. Furthermore, the ultraviolet irradiation amount applied to the carboxymethylated cellulose in the irradiation reaction apparatus may be optionally controlled by adjusting the concentration of the carboxymethylated cellulose in the irradiation apparatus by dilution with water, by adjusting the concentration of the carboxymethylated cellulose by blowing inactive gas such as air and nitrogen into the carboxymethylated cellulose, or the like. These conditions such as the retention time and the concentration may be appropriately set depending on the intended quality (such as the fiber length and the polymerization degree of cellulose) of the carboxymethylated cellulose after ultraviolet irradiation.

When the ultraviolet irradiation treatment is performed in the presence of an auxiliary such as oxygen, ozone, and peroxides (hydrogen peroxide, peracetic acid, sodium percarbonate, sodium perborate, and the like), the efficiency of the photooxidation reaction is enhanced, which is preferable.

When irradiated with ultraviolet rays having the wavelength region of 135 to 242 nm, ozone is generated from the air existing in the gas phase around the light source. The generated ozone is continuously removing while continuously supplying air to the periphery of the light source, and then the removed ozone is injected into the carboxymethylated cellulose. Thereby, the ozone may also be utilized as an auxiliary for the photooxidation reaction without supplying ozone from the outside of the system. Furthermore, by supplying oxygen to the gas phase portion around the light source, a larger amount of ozone can be generated in the system, and the generated ozone may be used as an auxiliary for the photooxidation reaction. In this manner, the ozone secondarily generated in the ultraviolet irradiation reaction apparatus may also be utilized.

The ultraviolet irradiation treatment may be repeated multiple times. The number of repeated treatments is not particularly limited, and may be appropriately set depending on the relationship with, for example, the intended quality of the carboxymethylated cellulose. For example, the ultraviolet irradiation can be performed with ultraviolet rays at preferably from 100 to 400 nm, and more preferably from 135 to 260 nm, preferably from 1 to 10 times, and more preferably from 2 to 5 times, and for an irradiation time per treatment of preferably for 0.5 to 10 hours, and more preferably for 0.5 to 3 hours.

(Oxidative Decomposition Treatment)

When the carboxymethylated cellulose is subjected to an oxidative decomposition treatment in the viscosity lowering process, hydrogen peroxide and ozone are usually used in combination.

It is inferred that the reason why the use of hydrogen peroxide and ozone in combination can efficiently lower the viscosity of the carboxymethylated cellulose is as follows. On the surface of the carboxymethylated cellulose, the carboxymethyl group is localized, and a hydrated layer is formed. It is considered that there is a microscopic space, which is not observed in normal cellulose, between the cellulose chains of the carboxymethylated cellulose due to the action of the charge repelling force between the carboxymethyl groups. When the carboxymethylated cellulose is treated with ozone and hydrogen peroxide, a hydroxy radical having excellent oxidizing power is generated from the ozone and hydrogen peroxide. The hydroxy radical efficiently oxidizes and decomposes the cellulose chains in the carboxymethylated cellulose to eventually perform the shortening fibrillation of the carboxymethylated cellulose fibers. Therefore, the ratio of the acid-type carboxymethylated cellulose nanofiber having a short fiber length increases to lower the viscosity of the dispersion liquid of the acid-type carboxymethylated cellulose nanofiber.

Ozone can be generated by a known method with air or oxygen as a raw material using an ozone generator. The addition amount (in terms of mass) of ozone relative to the bone dry mass of the carboxymethylated cellulose is preferably from 0.1 to 3 times, more preferably from 0.3 to 2.5 times, and further preferably from 0.5 to 1.5 times. When the addition amount of ozone relative to the bone dry mass of the carboxymethylated cellulose is 0.1 times or more, the amorphous portion of cellulose can be sufficiently decomposed. When the addition amount of ozone relative to the bone dry mass of the carboxymethylated cellulose is 3 times or less, the excessive decomposition of cellulose can be suppressed, and the lowering of the yield of the carboxymethylated cellulose can be prevented.

The addition amount (in terms of mass) of hydrogen peroxide relative to the bone dry mass of the carboxymethylated cellulose is preferably from 0.001 to 1.5 times, and more preferably from 0.1 to 1.0 times. When the addition amount of hydrogen peroxide relative to the bone dry mass of the carboxymethylated cellulose is 0.001 times or more, the synergistic effect between ozone and hydrogen peroxide is exerted. It is sufficient for the decomposition of the carboxymethylated cellulose to add the hydrogen peroxide in an amount of 1.5 times or less relative to the carboxymethylated cellulose. Adding the hydrogen peroxide in an amount of exceeding 1.5 times relative to the carboxymethylated cellulose leads to increase the cost, which is not preferable.

As the conditions of the oxidative decomposition treatment with ozone and hydrogen peroxide, the pH value is preferably from 2 to 12, more preferably from 4 to 10, and further preferably from 6 to 8, the temperature is preferably from 10 to 90° C., more preferably from 20 to 70° C., and further preferably from 30 to 50° C., and the reaction time is preferably for 1 to 20 hours, more preferably for 2 to 10 hours, and further preferably for 3 to 6 hours, from the viewpoint of reaction efficiency.

An apparatus for performing the treatment with ozone and hydrogen peroxide is not particularly limited, and may be any known apparatus. Example thereof includes a normal reaction vessel provided with a reaction chamber, a stirrer, a chemical injector, a heater, and a pH electrode.

After the treatment with ozone and hydrogen peroxide, the ozone and hydrogen peroxide remained in the aqueous solution can also effectively act in the fibrillation process to further promote the lowering of the viscosity of the dispersion liquid of the acid-type carboxymethylated cellulose nanofiber.

[3. Use Applications]

The acid-type carboxymethylated cellulose nanofiber of the present invention may be used in various fields in which additives are generally used, such as foods, beverages, cosmetics, medicine, various chemical products, paper manufacturing, civil engineering, paints, inks, agricultural chemicals, construction, epidemic prevention medicament, electronic materials, flame retardants, household goods, and cleaning agents. Specifically, the acid-type carboxymethylated cellulose nanofiber of the present invention may be used as a thickener, a gelling agent, a paste, a food additive, an excipient, a compounding agent for rubber and plastics, an additive for paints, an additive for adhesives, an additive for paper manufacturing, an abrasive, a water retention agent, a shape retention agent, a mud water adjuster, a filtration auxiliary, a mud overflow inhibitor, and the like. The acid-type carboxymethylated cellulose nanofiber of the present invention may be applied to rubber or plastic materials, paints, adhesives, coating agents for coated paper, coated paper, binders, cosmetics, lubricant compositions, polishing compositions, crease reducing agents for clothes, smoothers for irons, and the like, which contain the aforementioned materials and agents as a component.

In particular, since the acid-type carboxymethylated cellulose nanofiber of the present invention has a certain degree of viscosity, the utilization for food additives as thickeners can be particularly expected. Also, since it has high transparency, the utilization for cosmetics or resin reinforcing materials may be particularly expected.

EXAMPLES

Hereinafter, the present invention will be described in more detail by examples. The following examples are for suitably explaining the present invention, and do not limit the present invention. The methods for measuring the values of physical properties and the like are the aforementioned measurement methods, unless otherwise stated.

[B-Type viscosity (mPa·s)]: Using a TV-10 type viscometer (Toki Sangyo Co., Ltd.), the B-type viscosity of 1% by mass aqueous dispersion liquid of the carboxymethylated cellulose nanofiber was measured under the condition of 20° C. and 60 rpm or 6 rpm.

[Degree of substitution with carboxymethyl group]: The degree of substitution with carboxymethyl group was measured by the following method.

About 2.0 g of a sample was precisely weighed, and placed in a 300 ml stoppered Erlenmeyer flask. Into the Erlenmeyer flask, 100 ml of nitric acid methanol (liquid obtained by adding 100 ml of special grade concentrated nitric acid to 1 L of anhydrous methanol) was added. The mixture was shaken for 3 hours to convert sodium salt of the carboxymethylated cellulose (hereinafter, also referred to as "Na-CMC") into carboxymethylated cellulose (hereinafter, also referred to as "H-CMC"). The bone dried H-CMC was precisely weighed in an amount of 1.5 to 2.0 g, and placed in a 300 ml stoppered Erlenmeyer flask. The H-CMC was wetted with 15 ml of 80% methanol, and added with 100 ml of 0.1N NaOH. The obtained product was shaken at room temperature for 3 hours. With phenolphthalein as an indicator, excess NaOH was back titrated with 0.1N $H_2SO_4$. Then, the degree of substitution with carboxymethyl group was calculated according to the following formula:

[{100×F−(0.1NH$_2$SO$_4$ (ml))×F'}/(bone dry mass (g) of H-CMC)]×0.1=A

Degree of substitution with carboxymethyl group=0.162 A/(1−0.058 A)

A: amount of 1N NaOH (ml) necessary for neutralization of 1 g of H-CMC
F': factor of 0.1N $H_2SO_4$
F: factor of 0.1N NaOH

[Ratio (%) of carboxy group]: The ratio of the carboxy group was measured by the following process.

First, 250 mL of 0.1% by mass slurry of a carboxymethylated cellulose nanofiber salt was prepared, and added with 0.1M hydrochloric acid aqueous solution so that the pH was adjusted 2.5. After that, while 0.1N sodium hydroxide aqueous solution was added, the degree of electrical conductivity was measured until the pH reached 11. From the amount of sodium hydroxide (a) consumed in the neutralization stage of weak acid in which the change in electrical conductivity was moderate, the amount of the carboxy group and the amount of the carboxylate group were calculated according to the following formula (2): (2): amount of carboxy group and amount of carboxylate group (mmol/g carboxymethylated cellulose nanofiber salt)=a (ml)×0.1/mass (g) of carboxymethylated cellulose nanofiber salt.

Next, 250 mL of 0.1% by mass slurry of the desalted carboxymethylated cellulose nanofiber was prepared. While 0.1N sodium hydroxide aqueous solution was added, the degree of electrical conductivity was measured until the pH reached 11. From the amount of sodium hydroxide (b) consumed in the neutralization stage of weak acid in which the change in electrical conductivity was moderate, the amount of the carboxy group was calculated according to the following formula (3):

amount of carboxy group (mmol/g carboxymethylated cellulose nanofiber)=b (ml)×0.1/mass (g) of carboxymethylated cellulose nanofiber.　　(3):

From the obtained amounts of the carboxy group and carboxylate group, and the amount of the carboxy group, the ratio of the carboxy group was calculated according to the following formula (1):

ratio (%) of carboxy group=(amount of carboxy group/amount of carboxy group and amount of carboxylate group)×100.　　(1):

[Transparency (%)]: The transmittance of light at 660 nm through aqueous dispersion (solid content: about 1% (w/v)) of the carboxymethylated cellulose nanofiber was measured using a UV-VIS spectrophotometer UV-265FS (manufactured by Shimadzu Corporation), and the measured transmittance was defined as transparency.

[Yield (%)]: The yield is an yield in the desalting process of acid treating the carboxymethylated cellulose nanofiber salt to obtain the carboxymethylated cellulose nanofiber.

Example 1

Into a reaction vessel capable of stirring pulp, 250 g in terms of dry mass of pulp (LBKP, manufactured by Nippon Paper Industries Co., Ltd.) was placed, and added with 112 g of 50% by mass sodium hydroxide aqueous solution and 67 g of water while stirring. The mixture was stirred at 30° C. for 45 minutes for mercerization treatment, and thereafter added with 364 g of 35% by mass sodium monochloroacetate aqueous solution while stirring. The mixture was stirred at 30° C. for 60 minutes, and increased in temperature to 70° C. over 30 minutes. After that, a reaction was performed at 70° C. for 1 hour. Then, the reaction product was collected to obtain carboxymethylated pulp in which the degree of substitution with carboxymethyl group per glucose unit was 0.27 (hereinafter, also referred to as "carboxymethylated cellulose").

The carboxymethylated cellulose was adjusted with water into 1.053% (w/v), and treated three times using an ultra high pressure homogenizer (20° C., 140 Mpa) to obtain dispersion liquid of a carboxymethylated cellulose nanofiber salt (fibrillation process).

Into the obtained dispersion liquid of the carboxymethylated cellulose nanofiber salt, a cation exchange resin (manufactured by Organo Corporation, "Amberjet 1024") was added. The mixture was stirred at 20° C. for 0.3 hour for contact. After that, the cation exchange resin and the aqueous dispersion liquid were separated through a metal mesh (opening 100 mesh) to obtain a carboxymethylated cellulose nanofiber with a high yield of 92% (desalting process).

The B-type viscosity of 1% by mass aqueous dispersion liquid of the obtained carboxymethylated cellulose nanofiber was 4099 mPa·s under the condition of (60 rpm, 20° C.), and 22795 mPa·s under the condition of (6 rpm, 20° C.). The results are illustrated together with the yield in Table 1.

Comparative Example 1

Carboxymethylated cellulose nanofibers were not obtained even in the same manner as in Example 1 except that the desalting process was changed as follows. 10% hydrochloric acid aqueous solution was added to the dispersion liquid of the carboxymethylated cellulose nanofiber salt until the pH reached 2.4, and the mixture was stirred at 20° C. for 0.5 hour for contact. After that, filtration was performed, but no filtered material was obtained.

TABLE 1

|  |  | Example 1 | Comparative Example 1 |
|---|---|---|---|
|  | Yield (%) | 92 | — |
| B-Type viscosity | 60 rpm (mPa · s) | 4099 | — |
|  | 6 rpm (mPa · s) | 22795 | — |

As understood from Table 1, when the desalting process was performed with the cation exchange resins, the acid-type carboxymethylated cellulose nanofiber was obtained with a high yield of 92% (see Example 1). On the other hand, when the desalting process was performed with hydrochloric acid, the acid-type carboxymethylated cellulose nanofiber could not be obtained (see Comparative Example 1).

Example 2

Into the reaction vessel capable of stirring pulp, 250 g in terms of dry mass of pulp (LBKP, manufactured by Nippon Paper Industries Co., Ltd.) was placed, and added with 112 g of 50% by mass sodium hydroxide aqueous solution and 67 g of water while stirring. The mixture was stirred at 30° C. for 50 minutes for mercerization treatment, and thereafter added with 364 g of 35% by mass sodium monochloroacetate aqueous solution while stirring. The mixture was stirred at 30° C. for 60 minutes, and increased in temperature to 70° C. over 30 minutes. After that, a reaction was performed at 70° C. for 1 hour. Then, the reaction product was collected to obtain carboxymethylated pulp in which the degree of substitution with carboxymethyl group per glucose unit was 0.29 (hereinafter, also referred to as "carboxymethylated cellulose").

The carboxymethylated cellulose was adjusted with water into 1.053% (w/v), and treated three times using an ultra high pressure homogenizer (20° C., 150 Mpa) to obtain dispersion liquid of a carboxymethylated cellulose nanofiber salt.

Into the obtained dispersion liquid of the carboxymethylated cellulose nanofiber salt, a cation exchange resin (manufactured by Organo Corporation, "Amberjet 1024") was added. The mixture was stirred at 20° C. for 0.3 hour for contact. After that, the cation exchange resin and the aqueous dispersion liquid were separated through a metal mesh (opening 100 mesh) to obtain an acid-type carboxymethylated cellulose nanofiber with a high yield of 92%.

The B-type viscosity of 1.04% by mass aqueous dispersion of the obtained acid-type carboxymethylated cellulose nanofiber was 4099 mPa·s under the condition of (60 rpm, 20° C.), and 22795 mPa·s under the condition of (6 rpm, 20° C.). The transparency was 77.2%, and the ratio of the carboxy group was 98%. The results are shown in Table 2.

Comparative Example 2

The carboxymethylated cellulose obtained in Example 2 was adjusted with water into 1.053 wt %, and the pH was adjusted to 5 with 1N hydrochloric acid. After that, it was treated three times with an ultra high pressure homogenizer to obtain dispersion liquid of an acid-type carboxymethylated cellulose nanofiber.

The B-type viscosity of the 1.05% by mass aqueous dispersion liquid of the obtained acid-type carboxymethylated cellulose nanofiber was 1040 mPa·s under the condition of (60 rpm, 20° C.), and 6400 mPa·s under the condition of (6 rpm, 20° C.). The transparency was 3.3%, and the ratio of the carboxy group was 30.7%. The results are shown in Table 2.

TABLE 2

| | | Example 2 | Comparative Example 2 |
|---|---|---|---|
| B-Type viscosity | 60 rpm (mPa · s) | 4099 | 1040 |
| | 6 rpm (mPa · s) | 22795 | 6400 |
| Transparency (%) | | 77.2 | 3.3 |
| Ratio (%) of carboxy group | | 98 | 30.7 |

As understood from Table 2, when the desalting process was performed with the cation exchange resins, the ratio of the carboxy group was 98%. Thus, there was obtained an acid-type carboxymethylated cellulose nanofiber which was converted into the almost acid-type. Also, the transparency thereof was as high as 77.2% (see Example 2). On the other hand, when the desalting process was performed with hydrochloric acid, the ratio of the carboxy group in the carboxymethylated cellulose nanofiber was 30.7%. Thus, there was obtained a partial acid-type carboxymethylated cellulose nanofiber in which the ratio of the salt-type was more than the acid-type. Also, the transparency thereof was as low as 3.3% (see Comparative Example 2).

The B-type viscosity of the carboxymethylated cellulose nanofiber is higher, as the value for the degree of substitution with carboxymethyl is lower, and as the value for the average fiber diameter is smaller. For example, it is estimated that when an acid-type carboxymethylated cellulose nanofiber having an average fiber diameter of about 2 to about 4 nm is produced by changing the degree of substitution with carboxymethyl group of the carboxymethylated cellulose used in Example 1 of the present application from about 0.3 to about 0.10 and changing the pressure of machine processing and the number of processing operations, an acid-type carboxymethylated cellulose nanofiber in which the value for the B-type viscosity would be about 5.5 times (22500 mPa·s at 60 rpm, 126500 mPa·s at 6 rpm) that of the example could be obtained.

The invention claimed is:

1. An acid-type carboxymethylated cellulose nanofiber, having a degree of substitution with carboxymethyl group per glucose unit is in a range of from 0.01 to 0.50, and
having a B-type viscosity in aqueous dispersion with a concentration in a range of from 0.95 to 1.05% by mass in a range of from 1,000 to 25,000 mPa·s under a condition of 60 rpm and 20° C., and in a range of from 7,000 to 150,000 mPa·s under a condition of 6 rpm and 20° C.,
wherein a ratio of a carboxy group determined by formula (1) is 85% or more:

$$R_{CG}=N_{ROOR}/(N_{ROOR}+N_{ROOH})\times 100 \tag{1}$$

wherein $R_{CG}$ is the ratio (%) of carboxy groups, $N_{ROOR}$ is an amount of the carboxy group, and $N_{ROOH}$ is an amount of a carboxylate group.

2. The nanofiber of claim 1, wherein a light transmittance thereof at a wavelength of 660 nm in the aqueous dispersion with a concentration of 0.95 to 1.05% by mass is 65% or more.

3. A method for producing the acid-type carboxymethylated cellulose nanofiber of claim 1, the method comprising:
fibrillating carboxymethylated cellulose to obtain a carboxymethylated cellulose nanofiber; and
performing a desalting treatment through a cation exchange reaction,
wherein the desalting treatment comprises contacting an aqueous dispersion of the carboxymethylated cellulose nanofiber and the cation exchange resins, and then separating the cation exchange resins from the aqueous dispersion.

4. The method of claim 3, further comprising:
obtaining the carboxymethylated cellulose by subjecting a cellulose-based raw material to a mercerization treatment with a mercerizing agent and then reacting a resultant with a carboxymethylating agent.

5. The method of claim 4, wherein the mercerizing agent is an alkali metal hydroxide.

6. The method of claim 2, wherein the carboxymethylating agent is a compound of formula (1):

wherein

X is a halogen atom, and

M₁ is a hydrogen atom or an alkali metal.

7. The method of claim 3, wherein the fibrillating is fibrillating the carboxymethylated cellulose to obtain a carboxymethylated cellulose nanofiber salt, and wherein the desalting treatment is desalting the carboxymethylated cellulose nanofiber salt with the cation exchange resin.

8. The method of claim 3, further comprising:

lowering a viscosity of the carboxymethylated cellulose.

9. The nanofiber of claim 1, wherein the degree of substitution with carboxymethyl group per glucose unit is in a range of from 0.01 to 0.40.

10. The nanofiber of claim 9, wherein the B-type viscosity at 60 rpm and 20° C. is in a range of from 1300 to 25000 mPa·s.

11. The nanofiber of claim 1, wherein the degree of substitution with carboxymethyl group per glucose unit is in a range of from 0.05 to 0.35.

12. The nanofiber of claim 11, Wherein the B-type viscosity at 60 rpm and 20° C. is in a range of from 1300 to 25000 mPa·s.

13. The nanofiber of claim 1, wherein the degree of substitution with carboxymethyl group per glucose unit is in a range of from 0.01 to 0.29.

14. The nanofiber of claim 1, wherein the degree of substitution with carboxymethyl group per glucose unit is in a range of from 0.01 to 0.27.

15. The nanofiber of claim 1, wherein the ratio is greater than 85%.

16. The nanofiber of claim 1, wherein the ratio is 98% or more.

17. The nanofiber of claim 1, wherein the B-type viscosity at 60 rpm and 20° C. is in a range of from 1300 to 25000 mPa·s.

18. The nanofiber of claim 1, wherein the B-type viscosity at 60 rpm and 20° C. is in a range of from 1800 to 23000 mPa·s.

19. The nanofiber of claim 1, wherein the B-type viscosity at 60 rpm and 20° C. is in a range of from 3000 to 22500 mPa·s.

20. The nanofiber of claim 1, wherein the B-type viscosity at 60 rpm and 20° C. is in a range of from 4000 to 20000 mPa·s.

* * * * *